US006879762B2

(12) United States Patent
Mukasa (10) Patent No.: US 6,879,762 B2
(45) Date of Patent: Apr. 12, 2005

(54) OPTICAL TRANSMISSION LINE AND OPTICAL TRANSMISSION SYSTEM USING OPTICAL TRANSMISSION LINE

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 232 days.

(21) Appl. No.: 10/266,741

(22) Filed: Oct. 9, 2002

(65) Prior Publication Data

US 2003/0123826 A1 Jul. 3, 2003

(30) Foreign Application Priority Data

Oct. 10, 2001 (JP) ........................................ 2001-312854
Aug. 1, 2002 (JP) ........................................ 2002-225121

(51) Int. Cl.[7] ................................................ G02B 6/22
(52) U.S. Cl. ...................................... 385/123; 385/124
(58) Field of Search ................................ 385/123, 124, 385/127, 128

(56) References Cited

U.S. PATENT DOCUMENTS 5,838,867 A * 11/1998 Onishi et al. ................ 385/123
6,178,279 B1 * 1/2001 Mukasa et al. .............. 385/123
6,404,967 B1 * 6/2002 Arai et al. ................... 385/126
6,556,758 B1 * 4/2003 Kato ........................... 385/127
6,724,966 B1 * 4/2004 Mukasa ....................... 385/127

FOREIGN PATENT DOCUMENTS

WO     0192931     * 12/2001     ............ G02B/6/16

OTHER PUBLICATIONS

K. Mukasa, et al., 11th International Conference on Integrated Optics and Optical Fibre Communications, vol. 1, pp. 127–130, "Novel Network Fiber to Manage Dispersion at 1.55 μm with Combination of 1.3 μm Zero Dispersion Single Mode Fiber", Sep. 22–25, 1997.

Y. Liu, et al., Optical Fiber Communication, vol. 2, pp. 165–166, "Large Effective Area Dispersion–Shifted Fibers with Dual–Ring Index Profiles", Feb. 24–Mar. 1, 1996.

T. Kato, et al., Optical Fiber Communication Conference and Exhibit, vol. 6, p. 66, "Low Nonlinearity Dispersion-Shifted Fibers Employing Dual–Shaped Core Profile with Depressed Cladding", Feb. 16–21, 1997.

* cited by examiner

*Primary Examiner*—Daniel St. Cyr
(74) *Attorney, Agent, or Firm*—Oblon, Spivak, McClelland, Maier & Neustadt, P.C.

(57) ABSTRACT

Disclosed is an optical transmission line having a length L of 30 km to 150 km, preferably 30 km to 70 km, an absolute value of a dispersion not smaller than 8 ps/nm/km at a wavelength of 1.55 μm at every point of the optical transmission line, a maximum accumulated dispersion not larger than 7.5×L (ps/nm) at a wavelength of 1.55 μm, and a dispersion for the entire optical transmission line of –5 to +5 ps/nm/km at a wavelength of 1.55 μm. The optical transmission line is formed by, for example, combination of a positive dispersion optical fiber and a negative dispersion optical fiber.

14 Claims, 6 Drawing Sheets

OPTICAL TRANSMISSION LINE AND OPTICAL TRANSMISSION SYSTEM USING OPTICAL TRANSMISSION LINE

CROSS-REFERENCE TO RELATED APPLICATIONS

This application is based upon and claims the benefit of priority from the prior Japanese Patent Applications No. 2001-312854, filed Oct. 10, 2001; and No. 2002-225121, filed Aug. 1, 2002, the entire contents of both of which are incorporated herein by reference.

BACKGROUND OF THE INVENTION

1. Field of the Invention

The present invention relates to a field of optical communication, particularly, to an optical transmission line used for a wavelength-division multiplex transmission and an optical transmission system using the optical transmission line.

2. Description of the Related Art

Presently, vigorous studies are being made of the wavelength-division multiplex transmission, and vigorous efforts to develop an optical transmission line using wavelength-division multiplexing transmission are being made. As reported in conference proceedings such as OFC '96 WKI and OFC '97 TuN2, optimization of non-zero dispersion-shifted optical fiber (NZ-DSF) was pursued in the past as such an optical transmission line.

Non-zero dispersion-shifted optical fiber is an optical fiber in which the zero dispersion wavelength is shifted so as to diminish the dispersion at a wavelength in 1.55 μm band, which is being studied nowadays for the wavelength-division multiplexing transmission. The non-zero dispersion-shifted optical fiber that is proposed nowadays has a dispersion of to 8 ps/nm/km at wavelengths in 1.55 μm band.

However, such a non-zero dispersion-shifted optical fiber gives rise to the problem that, if the effective core area ($A_{eff}$) of the optical fiber is increased in general in an attempt to suppress the self phase modulation (SPM) or the cross phase modulation (XPM), the bending loss or the dispersion slope is increased. Also, since four-wave mixing (FWM) is prominent in the case where the dispersion is small, the non-zero dispersion-shifted optical fiber in which the dispersion is small in the used wavelength band as described above is disadvantageous in this point.

Under the circumstances, a method for managing the dispersion over the entire optical transmission line is being proposed in order to overcome the problems noted above. For example, Jpn. Pat. Appln. KOKAI Publication No. 8-42102 discloses that it is possible to obtain an optimum transmission line by connecting a positive dispersion optical fiber having a low non-linearity and a negative dispersion optical fiber having a relatively high non-linearity in this order.

Also, as a specific example, an optical transmission line of SMF+RDF, in which a single mode optical fiber (SMF) is connected to a transmission line type dispersion compensation optical fiber, is proposed in, for example, "ECOC '97 Vol. 1, P127". Since each of SMF and RDF, which has a large local dispersion (absolute value) of about 16 to 22 ps/nm/km at a wavelength in 1.55 μm band, is advantageous in the aspect of suppressing the FWM.

The SMF+RDF optical transmission line is a system in which a single mode optical fiber (SMF) having a dispersion of, for example, 16 to 20 ps/nm/km at a wavelength of 1.55 μm is arranged in the front stage and the dispersion or the dispersion slope of the single mode optical fiber is compensated by a dispersion compensation optical fiber (RDF) connected to the rear stage and having reverse dispersion characteristics. Proposed in the SMF+RDF optical transmission line is the SMF:RDF length ratio falling within a range of between 1:1 and 5:1.

However, where higher speed transmission is considered, it is known in the art that the large-dispersion absolute value of the SMF or RDF generates a large accumulated dispersion of the optical transmission line, with the result that a greatly distorted waveform brings about a mutual function among the signals so as to raise an obstacle to high-speed transmission.

To be more specific, in the optical transmission line of SMF+RDF proposed above, the length ratio of SMF:RDF falls within a range of between 1:1 and 5:1. In the optical transmission line in which the SMF occupies more than half the optical transmission line, the accumulated dispersion is made not smaller than 8×L (ps/nm), where L represents the length of the optical transmission line. This means that, if the length of the optical transmission line is assumed to be, for example, 40 km, the accumulated dispersion is not smaller than 8×40=320 ps/nm, which is disadvantageous in performing high-speed transmission.

BRIEF SUMMARY OF THE INVENTION

An object of the present invention is to provide an optical transmission line, which permits suppressing both the non-linear optical phenomenon such as the four-wave mixing and the accumulated dispersion and which also permits high-speed transmission.

Another object of the present invention is to provide an optical transmission system using the optical transmission line referred to above.

According to one aspect of the present invention, there is provided an optical transmission line having a length L of 30 km to 150 km, an absolute value of dispersion not smaller than 8 ps/nm/km at a wavelength of 1.55 μm at every point of the optical transmission line, a maximum accumulated dispersion not larger than 7.5×L (ps/nm) at a wavelength of 1.55 μm, and a dispersion for the entire optical transmission line of −5 to +5 ps/nm/km at a wavelength of 1.55 μm.

According to another aspect of the present invention, there is provided an optical transmission line having a length L of 30 km to 70 km, an absolute value of dispersion not smaller than 8 ps/nm/km at a wavelength of 1.55 μm at every point of the optical transmission line, a maximum accumulated dispersion not larger than 7.5×L (ps/nm) at a wavelength of 1.55 μm, and a dispersion for the entire optical transmission line of −5 to +5 ps/nm/km at a wavelength of 1.55 μm.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

The optical transmission line according to one aspect of the present invention is such that the optical transmission line has a length L of 30 km to 150 km, an absolute value of dispersion not smaller than 8 ps/nm/km at a wavelength of 1.55 μm at every point of the optical transmission line, a maximum accumulated dispersion not larger than 7.5×L (ps/nm) at a wavelength of 1.55 μm, and a dispersion for the entire optical transmission line of −5 to +5 ps/nm/km at a wavelength of 1.55 μm.

Also, the optical transmission line according to another aspect of the present invention is such that the optical transmission line has a length L of 30 km to 70 km, an absolute value of dispersion not smaller than 8 ps/nm/km at a wavelength of 1.55 μm at every point of the optical transmission line, a maximum accumulated dispersion not larger than 7.5×L (ps/nm) at a wavelength of 1.55 μm, and a dispersion for the entire optical transmission line of −5 to +5 ps/nm/km at a wavelength of 1.55 μm.

The optical transmission lines of the present invention include preferred constructions as pointed out below:

(1) An optical transmission line according to the above aspects of the present invention comprises a positive dispersion optical fiber having a positive dispersion at a wavelength in 1.55 μm band and a negative dispersion optical fiber connected to the positive dispersion optical fiber and having a negative dispersion at a wavelength in 1.55 μm band.

(2) An optical transmission line according to the above aspects of the present invention comprises at least three kinds of optical fibers which are connected to each other.

(3) An optical transmission line according to item (2) given above is such that a first positive dispersion optical fiber having a positive dispersion at a wavelength in 1.55 μm band is connected to a negative dispersion optical fiber having a negative dispersion at a wavelength in 1.55 μm band, and the negative dispersion optical fiber is connected to a second positive dispersion optical fiber having a positive dispersion at a wavelength in 1.55 μm band.

(4) An optical transmission line according to item (2) given above is such that a positive dispersion optical fiber having a positive dispersion at a wavelength in 1.55 μm band is connected to a first negative dispersion optical fiber having a negative dispersion at a wavelength in 1.55 μm band, and the negative dispersion optical fiber is connected to a second negative dispersion optical fiber having a negative dispersion at a wavelength in 1.55 μm band.

(5) An optical transmission line according to any one of items (1) to (4) given above is such that said positive dispersion optical fiber has a transmission loss not larger than 0.25 dB/km and an effective core area not smaller than 60 μm² at a wavelength of 1.55 μm, and said negative dispersion optical fiber has a transmission loss not larger than 0.30 dB/km and an effective core area not smaller than 30 μm² at a wavelength of 1.55 μm.

(6) An optical transmission line according to any one of items (1) to (5) given above is such that said positive dispersion optical fiber has a value obtained by dividing the dispersion by the dispersion slope of at least 100 nm, and said negative dispersion optical fiber has a value obtained by dividing the dispersion by the dispersion slope, which is not larger than 500 nm.

(7) An optical transmission line according to any one of items (1) to (6) given above is such that the cutoff wavelength of 2 m of each of the positive dispersion optical fiber and the negative dispersion optical fiber is not longer than 1,600 nm, and the bending loss of each of the positive dispersion optical fiber and the negative dispersion optical fiber is not larger than 10 dB/m at the diameter of 20 mm and at a wavelength of 1.55 μm.

(8) An optical transmission line according to any one of items (1) to (7) given above is such that at least one of the positive dispersion optical fiber and the negative dispersion optical fiber has at least 3-layered cores inside a cladding having a W+segment core-type refractive index profile such that the first core in the central portion of the optical fiber has a refractive index higher than that of the cladding, the second core positioned to surround the outer circumferential surface of the first core has a refractive index smaller than that of the cladding, and the third core positioned to surround the outer circumferential surface of the second core has a refractive index higher than that of the cladding.

(9) An optical transmission line according to any one of items (1) to (8) given above, is such that said positive dispersion optical fiber has at least two-layered cores inside the cladding, and the first core in the central portion of the optical fiber has a refractive index smaller than that of the cladding so as to form a concave refractive index profile.

(10) An optical transmission line according to any one of items (1) to (9) given above, is such that said negative dispersion optical fiber has at least 4-layered cores inside a cladding including a first core positioned in the central portion of the optical fiber and having a refractive index higher than that of the cladding, a second core positioned to surround the outer circumferential surface of the first core and having a refractive index smaller than that of the cladding, a third core positioned to surround the outer circumferential surface of the second core and having a refractive index higher than that of the cladding, and a Δ+layer positioned between the third core and the cladding and having a refractive index higher than that of the cladding.

Various embodiments of the present invention will now be described with reference to the accompanying drawings.

Figures 1, 2:
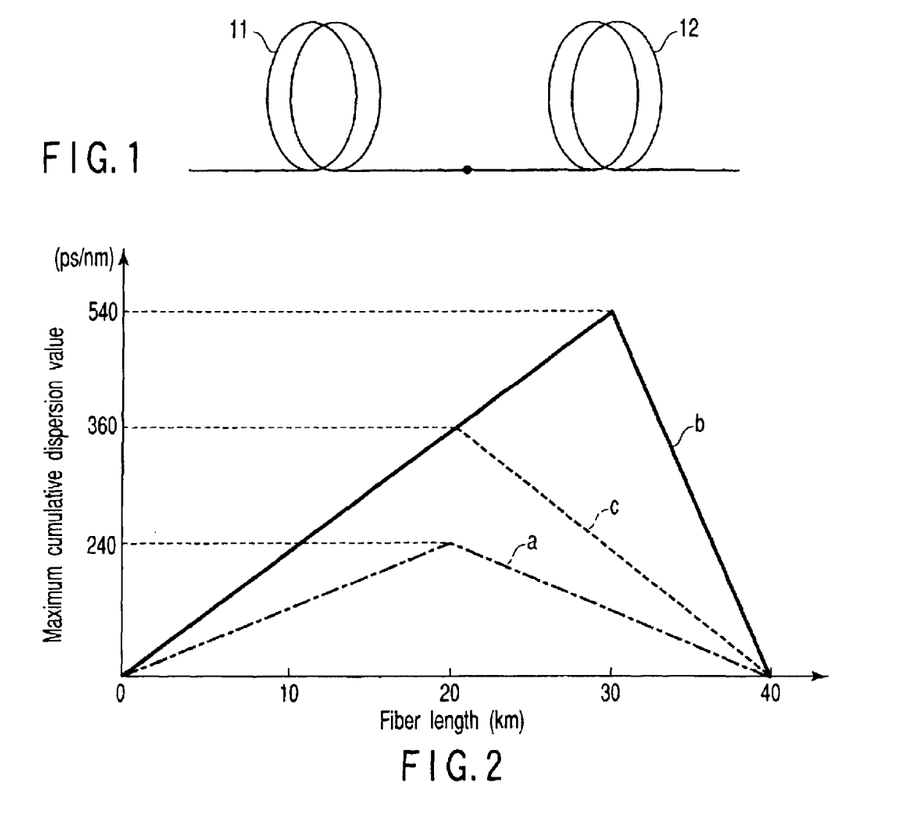
FIG. 1 shows the construction of the point of the optical transmission line according to a first embodiment of the present invention.
FIG. 2 is a graph showing the accumulated dispersion of the optical transmission line shown in FIG. 1 in comparison with the value for a Comparative Example.

FIG. 1 shows the construction of the main part of the optical transmission line according to a first embodiment of the present invention. As shown in the drawing, the optical transmission line according to the first embodiment of the present invention comprises a positive dispersion optical fiber 11 having a positive dispersion at a wavelength in 1.55 μm band and a negative dispersion optical fiber 12 connected to the positive dispersion optical fiber 11 and a having negative dispersion at a wavelength in 1.55 μm band.

The optical transmission line according to the first embodiment of the present invention is such that the optical transmission line has a length L of 30 km to 150 km, preferably 30 km to 70 km, an absolute value of dispersion not smaller than 8 ps/nm/km at a wavelength of 1.55 μm at every point of the optical transmission line, a maximum accumulated dispersion not larger than 7.5×L (ps/nm) at a wavelength of 1.55 μm, and a dispersion over the entire region of the optical transmission line falling within a range of between −5 ps/nm/km and +5 ps/nm/km at a wavelength of 1.55 μm.

Proposed is, for example, SMF+RDF as a management line for a long distance transmission, which is constructed such that the distance in a span is set at about 30 km to 70 km. Also, it is attempted recently to increase the transmission distance of the SMF+RDF type transmission line to about 150 km by application of Raman amplification. The SMF has a dispersion of 16 to 20 ps/nm/km at a wavelength of 1.55 μm, and the RDF is arranged in the latter stage of the SMF+RDF system in order to compensate the dispersion or the dispersion slope of the SMF.

Proposed is a length ratio of SMF:RDF falling within a range of between 1:1 and 5:1. However, in the transmission line in which the SMF occupies more than half the length, the accumulated dispersion is increased to a level not smaller than 8×L ps/nm if the length is set at L. This implies that, if the length of the optical fiber is set at 40 km, an accumulated dispersion not smaller than 8×40=320 ps/nm is caused to reside in the optical fiber, which is disadvantageous for high-speed transmission. Therefore, an extensive research is being conducted in an attempt to permit the accumulated dispersion of the system to be not larger than 7.5×L (ps/nm) at a wavelength in 1.55 μm band.

If the optical transmission line has an accumulated dispersion of this level in an optical transmission system including at least two relays arranged apart from each other, it is possible to permit the accumulated dispersion of the optical transmission line arranged in a span to be suppressed to a value not larger than 300 ps/nm in the case where the distance in a span is assumed to be 40 km. It is desirable for the accumulated dispersion, which differs depending on the span fiber length and the requirement of the system, to be not larger than 300 ps/nm in the case of considering high-speed transmission of, for example, 40 Gbps.

Incidentally, when it comes to an optical fiber applied to an optical transmission line in this view point, it is desirable to use an optical fiber having a small dispersion. However, where the dispersion is excessively small, four wave mixing (FWM) would be generated. Such being the situation, it is not desirable to use an optical fiber having a dispersion of about 0 to 8 ps/nm/km at a wavelength of 1.55 μm like the conventional NZ-DSF.

Under the circumstances, it is desirable for the dispersion to be not smaller than 8 ps/nm/km at every point of the optical transmission line. Of course, it is important for average dispersion (residual dispersion) in the entire optical transmission line to be low dispersion close to zero, e.g., −5 to 5 ps/nm/km, so as to prevent the waveform distortion of signal due to the dispersion. In this case, it is possible to construct the transmission line capable of suppressing the FWM, though the accumulated dispersion in substantially the zero dispersion is small, i.e., 7.5×L (ps/nm), in the entire transmission line. Also, in addition to the case where it is desirable for the residual dispersion to be absolutely zero, there is a case where the residual dispersion is set at a very small dispersion in view of the offsetting function with, for example, the self phase modulation (SPM).

It should be noted, however, that, if the length L of the optical transmission line is large, i.e., 70 km or more, the accumulated dispersion is increased very much to 500 ps/nm or more and the transmission loss is increased, even if the coefficient of the accumulated dispersion is set at a small value of 7.5. Therefore, it is particularly desirable for the length of the optical transmission line to be not larger than 70 km. It should be noted in this connection that, in the case of using, for example, a Raman amplification, the span length is prolonged preferentially in some cases. However, it is necessary for the maximum distance in a span to be not larger than 150 km, preferably not larger than 70 km, in view of the accumulated dispersion. It should be noted in this connection that it is desirable for the maximum value of the accumulated dispersion to be as small as possible, e.g., not larger than 300 ps/nm, as described previously.

Also, if the optical transmission line is excessively short, the distance in a span is made excessively short in the optical transmission system formed by applying the optical transmission line, with the result that the number of relays arranged in forming the optical transmission system will be increased. Under the circumstances, it is necessary for the optical transmission line to have a length of at least 30 km.

In view of the aspect of suppressing average dispersion of the entire optical transmission line to a minimum dispersion, it is desirable to use a positive dispersion optical fiber and a negative dispersion optical fiber in combination. Incidentally, the combination itself is proposed in, for example, the optical transmission line of SMF+RDF. However, the proposed optical transmission line was defective in that the accumulated dispersion is large, as described previously.

In order to suppress the accumulated dispersion of the optical transmission line, it is considered reasonable to combine a positive dispersion optical fiber and a negative dispersion optical fiber each having an absolute value of dispersion of, for example, 15 ps/nm/km or less at a wavelength in 1.55 μm band. Where these optical fibers are combined at the fiber length ratio of about 1:1, the length occupied by the positive dispersion optical fiber is ½ of the total length L so as to make it possible to suppress the maximum accumulated dispersion value to 7.5×L (ps/nm) or less.

For example, an optical transmission line having a length of 40 km is formed by connecting a positive dispersion optical fiber having a dispersion of +12 ps/nm/km at a wavelength of 1.55 μm to a negative dispersion optical fiber having a dispersion of −12 ps/nm/km at a wavelength of 1.55 μm at the length ratio of about 1:1. In this case, it is possible to suppress the maximum accumulated dispersion to a small value of 12×20=240 ps/nm while setting the total dispersion of the optical transmission line at zero. It follows that it is possible to cope with high-speed transmission such as 40 Gb/s.

Curve "a" shown in FIG. 2 represents the maximum accumulated dispersion characteristics for specific example 1 in the first embodiment of the present invention. Specific example 1 referred to above represents an optical transmission line having a length of 40 km and prepared by connecting a positive dispersion optical fiber having a dispersion of +12 ps/nm/km at a wavelength of 1.55 μm to a negative dispersion optical fiber having a dispersion of −12 ps/nm/km at a wavelength of 1.55 μm at the length ratio of about 1:1 as described above.

According to the optical transmission line for specific example 1, it is possible to suppress the maximum accumulated dispersion to a small value while maintaining the total dispersion of the optical transmission line at zero.

On the other hand, each of curves "b" and "c" shown in FIG. 2 is directed to a comparative example relative to the first embodiment of the present invention and represents the characteristics of the optical transmission line formed by the combination of SMF and RDF.

The optical transmission line for comparative example 1, which exhibits the characteristics denoted by curve "b" in FIG. 2, is directed to an optical transmission line prepared by combining an SMF having a dispersion of 18 ps/nm/km at a wavelength of 1.55 μm with an RDF having a dispersion of −54 ps/nm/km at a wavelength of 1.55 μm at the length ratio of 3:1. The length of the optical transmission line for comparative example 1 was 40 km. It should be noted that the maximum accumulated dispersion value for comparative example 1 is markedly larger than that for specific example 1 of present invention.

The optical transmission line for comparative example 2, which exhibits the characteristics denoted by curve "c" in FIG. 2, is directed to an optical transmission line prepared by combining an SMF having a dispersion of 18 ps/nm/km at a wavelength of 1.55 μm with an RDF having a dispersion of −18 ps/nm/km at a wavelength of 1.55 μm at the length ratio of 1:1. The length of the optical transmission line for comparative example 2 was 40 km. It should be noted that the maximum accumulated dispersion value for comparative example 2 is smaller than that for comparative example 1, but is larger than that for specific example 1 of present invention.

Incidentally, in the first embodiment of the present invention, it is possible to use a positive dispersion optical fiber 11 with the dispersion very much suppressed to, for example, 8 to 10 ps/nm/km up to a region of 7.5×L or less and to compensate the remaining portion with a negative dispersion optical fiber having a large dispersion such as a dispersion compensation optical fiber (DCF).

Figure 3A:
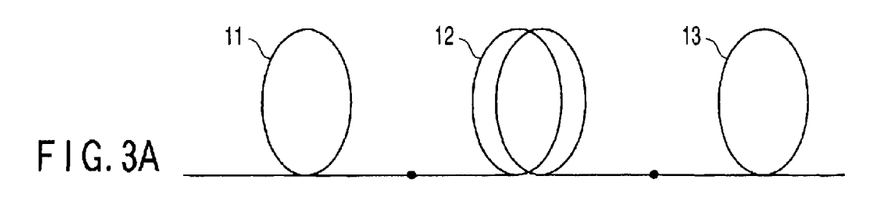
FIGS. 3A and 3B show the constructions of the points of the optical transmission line according to a second embodiment of the present invention.

An optical transmission line according to a second embodiment of the present invention will now be described. The optical transmission line according to the second embodiment is formed by connecting three kinds of optical fibers. The construction of the three kinds of the optical fibers is not particularly limited. It is possible to set appropriately the construction of the optical fiber. FIG. 3A shows one example of the construction.

The optical transmission line shown in FIG. 3A comprises a first positive dispersion optical fiber 11 having a positive dispersion at a wavelength in 1.55 μm band, a negative dispersion optical fiber 12 connected to the first positive dispersion optical fiber 11 and having a negative dispersion at a wavelength in 1.55 μm band, and a second positive dispersion optical fiber 13 connected to the negative dispersion optical fiber 12 and having a positive dispersion at a wavelength in 1.55 μm band.

Figure 3B:
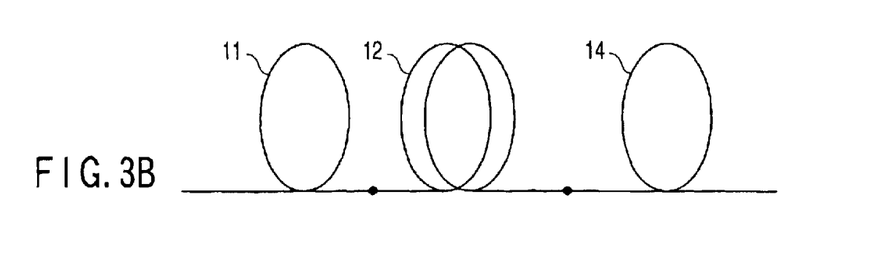

FIG. 3B shows another example of the construction of the optical transmission line according to the second embodiment of the present invention. The optical transmission line shown in FIG. 3B comprises a positive dispersion optical fiber 11 having a positive dispersion at a wavelength in 1.55 μm band, a first negative dispersion optical fiber 12 connected to the positive dispersion optical fiber 11 and having a negative dispersion at a wavelength in 1.55 μm band, and a second negative dispersion optical fiber 14 connected to the first negative dispersion optical fiber 12 and having a negative dispersion at a wavelength in 1.55 μm band.

The optical transmission line according to the second embodiment of the present invention has a feature similar to that of the optical transmission line according to the first embodiment described previously. For further suppressing the accumulated dispersion, it is effective to combine three kinds of optical fibers as in the optical transmission line according to the first embodiment of the present invention. When it comes to the optical transmission line according to the second embodiment of the present invention, it is considered possible to suppress the accumulated dispersion to 7.5×L or less even by using, for example, the conventional SMF and RDF.

Figure 4:
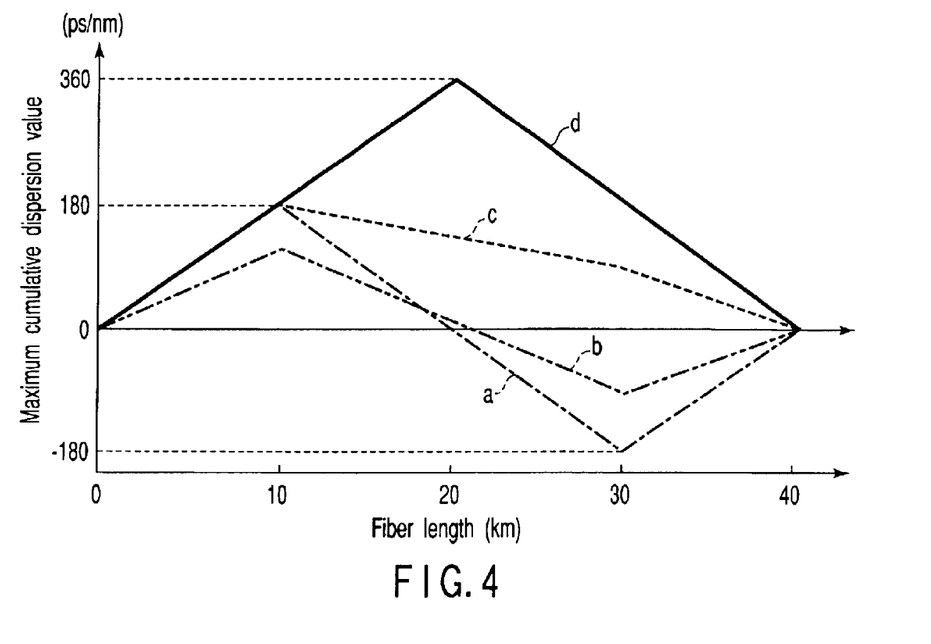
FIG. 4 is a graph showing the accumulated dispersions of the optical transmission lines shown in FIGS. 3A and 3B in comparison with the value for the Comparative Example.

For example, curve "a" shown in FIG. 4 represents the maximum accumulated dispersion value of the optical transmission line for specific example 2 according to the second embodiment of the present invention. In the optical transmission line for specific example 2, each of the first and second positive dispersion optical fibers 11 and 13 was formed by an SMF having a dispersion of 18 ps/nm/km at a wavelength of 1.55 μm, and the negative dispersion optical fiber 12 was formed by an RDF having a dispersion of −18 ps/nm/km at a wavelength of 1.55 μm.

According to the optical transmission line for specific example 2, it is possible to decrease the maximum value of the accumulated dispersion to 180 ps/nm or less, which is markedly smaller than the accumulated dispersion of the optical transmission line for comparative example 2 having the characteristics denoted by curve "d" shown in FIG. 4.

Also, in the case of employing the construction of the transmission line like the optical transmission line for the second embodiment, it is possible to obtain the merit that the bidirectional communication can be performed easily. It should be noted in this connection that the SMF is an optical fiber having a non-linearity lower than that of the RDF. Therefore, it is desirable to arrange an optical fiber having a low non-linearity on the incident side of the light, i.e., a region having a strong signal light power.

In other words, the system constituted by the positive dispersion optical fiber 11, the negative dispersion optical fiber 12 and the positive dispersion optical fiber 13 like the optical transmission line according to the second embodiment of the present invention is advantageous in view of not only the accumulated dispersion but also the bidirectional communication.

It should also be noted that the method of suppressing the accumulated dispersion by the combination of at least three optical fibers permits producing a sufficient effect even in the case of using the conventional SMF and RDF. In addition, curve "b" shown in FIG. 4 covers an optical transmission line according to the third embodiment of the present invention, in which the SMF and the RDF are replaced by optical fibers which permit more suppressing the absolute value of the dispersion than the SMF and RDF. As apparent from curve "b", it is possible to further suppress the accumulated dispersion in this case.

Of course, the combination of the optical fibers forming an optical transmission line is not limited to the combination of the positive dispersion optical fiber 11, the negative dispersion optical fiber 12 and the positive dispersion optical fiber 13 shown in FIG. 3A. Specifically, it is also possible to employ the construction shown in FIG. 3B. To be more specific, the optical transmission line according to the second embodiment of the present invention comprises every construction for suppressing the accumulated dispersion such as the SMF, a negative dispersion optical fiber capable of suppressing the dispersion and the RDF. It should be noted in this connection that, regardless of the number of optical fibers constituting the optical transmission line, it is effective for suppressing the accumulated dispersion to use an optical fiber whose absolute value of the dispersion is suppressed.

Incidentally, curve "c" shown in FIG. 4 represents the characteristics of the optical transmission line constituted by the combination of an SMF, a negative dispersion optical fiber whose dispersion is suppressed, and an RDF. On the other hand, curve "d" shown in FIG. 4 represents the characteristics of the optical transmission line for comparative example 2.

As described above, the optical fiber with suppressed dispersion is suppressed is more advantageous than the SMF and the RDF for suppressing the accumulated dispersion. However, it is insignificant to suppress the dispersion if the characteristics are more greatly degraded than the SMF or the RDF as a result of suppressing the dispersion.

Under the circumstances, it is desirable for the positive dispersion optical fibers 11, 13 and the negative dispersion optical fibers 12, 14 collectively constituting the optical transmission line to be constructed as follows. To be more specific, it is desirable for the positive dispersion optical fibers 11, 13 to have an effective core area ($A_{eff}$) for the wavelength band used (i.e., for wavelengths in 1.55 $\mu$m band in this case), which is larger than the value of the ordinary DSF, i.e., 50 to 60 $\mu m^2$, and to have a transmission loss for the wavelength band noted above, which is not larger than 0.25 dB/km.

On the other hand, it is desirable for the negative dispersion optical fibers 12, 14 to have an effective core area ($A_{eff}$) for the wavelength band used (i.e., for a wavelength of 1.55 $\mu$m band in this case), which is larger than the value of the ordinary RDF, i.e., 20 to 30 $\mu m^2$, and to have a transmission loss for a wavelength band noted above, which is not larger than 0.30 dB/km.

Further, concerning the dispersion slope of the entire optical transmission line formed by connecting the positive dispersion optical fibers 11, 13 and the negative dispersion optical fibers 12, 14, it is desirable for the value of DPS (Dispersion Per Slope) obtained by dividing the dispersions of the positive dispersion optical fibers 11, 13 by the dispersion slope to be as close as possible to the value of DPS for the negative dispersion optical fibers 12, 14. If the value of DPS for the positive dispersion optical fibers 11, 13 is closer to the value of DPS for the negative dispersion optical fibers 12, 14, it is possible to obtain flat dispersion characteristics in a wide range of wavelengths.

To be more specific, it is desirable for the positive dispersion optical fibers 11, 13 to have a value of DPS not smaller than 100 nm and for the negative dispersion optical fibers 12, 14 to have a value of DPS not larger than 500 nm. Needless to say, it is more desirable for these DPS values to be closer to each other.

Further, if the single mode condition and the bending loss value are degraded, the transmission performance would be affected by these degradation. Therefore, it is desirable for the cutoff wavelength ($\lambda c$) to be not longer than 1,600 nm for 2 m (to design the optical fiber to permit the cutoff wavelength ($\lambda c$) to be not longer than 1,500 nm in an entire transmission line) and for the bending loss for a diameter of 20 mm to be not larger than 10 dB/m for a wavelength of 1.55 $\mu$m band.

The present inventor has conducted an optimizing design of an optical fiber satisfying the characteristics described above. To be more specific, the present inventor has conducted the optimization for each of the positive dispersion optical fibers 11, 13 and the negative dispersion optical fibers 12, 14 as follows.

First of all, the optimizing design was conducted for the positive dispersion optical fibers 11 and 13. Various constructions can be proposed in respect of the construction of the positive dispersion optical fibers 11 and 13. In this case, the optimization was conducted by selecting a relatively simple construction as shown in FIG. 5.

Figure 5:
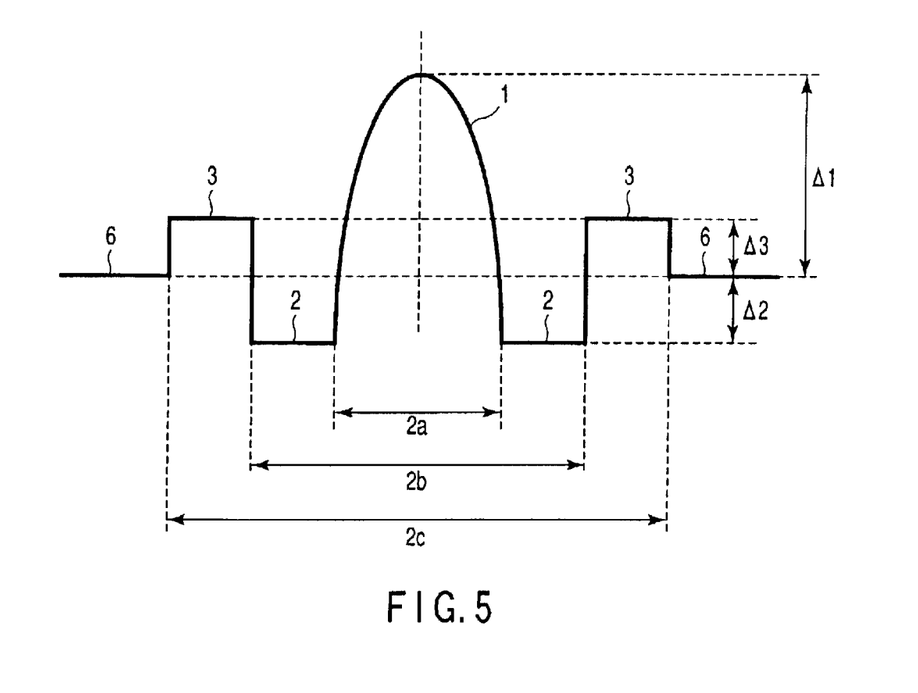
FIG. 5 shows the refractive index profile of a core 3-layer structure (W+segment core type)

The positive dispersion optical fiber shown in FIG. 5 is a W+segment core type optical fiber having at least three cores formed inside a cladding 6 including a first core (center core) 3 positioned in the central portion of the optical fiber and having a refractive index higher than that of the cladding 6, a second core 2 formed to surround the outer circumferential surface of the first core 1 and having a refractive index lower than that of the cladding 6, and a third core (segment core) 3 formed to surround the outer circumferential surface of the second core 2 and having a refractive index higher than that of the cladding 6. The refractive index of the first core 1 is distributed to provide an α-exponential profile.

In optimizing the refractive index profile, all the parameters were optimized including the relative refractive index difference Δ1 between the first core 1 and the cladding 6, the relative refractive index difference Δ2 between the second core 2 and the cladding 6, the relative refractive index difference Δ3 between the third core 3 and the cladding 6, the α constant (α-exponential), the diameter ratio a:b:c of the first core 1, the second core 2 and the third core 3, and the core diameter. The optimization was intended to suppress the dispersion while maintaining the non-linearity, the dispersion slope, the cutoff wavelength, etc., at satisfactory values.

Table 1 shows the changes in the characteristics, covering the case where the refractive index profile was optimized by changing the relative refractive index difference Δ1 while fixing the other parameters.

TABLE 1

| Δ1 % | α | Δ2 % | Δ3 % | a:b:c | Core diameter μm | Dispersion ps/nm/km | DPS nm | $A_{eff}$ μm² | λc nm | Bending loss dB/m |
|---|---|---|---|---|---|---|---|---|---|---|
| 0.39 | 10 | 0 | 0.10 | 0.4:0.7:1 | 20.3 | 13.7 | 238 | 80.0 | 1615 | 5.0 |
| 0.41 | 10 | 0 | 0.10 | 0.4:0.7:1 | 19.0 | 12.2 | 203 | 74.0 | 1534 | 5.0 |
| 0.43 | 10 | 0 | 0.10 | 0.4:0.7:1 | 17.9 | 10.7 | 175 | 69.0 | 1415 | 5.0 |
| 0.45 | 10 | 0 | 0.10 | 0.4:0.7:1 | 17.1 | 9.8 | 158 | 66.0 | 1335 | 5.0 |
| 0.47 | 10 | 0 | 0.10 | 0.4:0.7:1 | 16.3 | 8.2 | 139 | 63.1 | 1297 | 5.0 |
| 0.49 | 10 | 0 | 0.10 | 0.4:0.7:1 | 15.6 | 7.7 | 121 | 60.9 | 1265 | 5.0 |

*Core diameter represents the value of 2c.

In Table 1 and each of the Tables referred to herein later, "Dispersion" denotes the dispersion at a wavelength of 1.55 μm, "DSP" denotes the value obtained by dividing the dispersion at a wavelength of 1.55 μm by the dispersion slope, "$A_{eff}$" denotes the effective core area at a wavelength of 1.55 μm, "λc" denotes the cutoff wavelength, and "Bend loss" denotes the bending loss value at a diameter of 20 mm at a wavelength of 1.55 μm.

As shown in Table 1, it is possible to suppress the absolute value of the dispersion by increasing the value of Δ1. However, if the dispersion is excessively suppressed, the problem of the FWM generation is brought about. Therefore, it is important to select an appropriate range of the dispersion. Table 1 also shows that, if the absolute value of the dispersion is suppressed, the value of DSP is made excessively small, and the effective core area for a wavelength of 1.55 μm is also diminished.

Under the circumstances, Table 1 supports that, under the conditions shown in Table 1, it is necessary to set the difference Δ1 at 0.49% or less in order to permit the dispersion to be not smaller than 8 ps/nm/km (and in order to prevent DPS and the effective core area from being excessively diminished) and to set the difference Δ1 at 0.41% or more in order to permit the cutoff wavelength to be not longer than 1,600 nm.

Likewise, the changes in the value of DPS and the cutoff wavelength were studied by fixing the dispersion at 10 ps/nm/km, by changing the diameter ratio a/c of the first core (center core) 1 to the third core (segment core) 3, and by setting the other parameters as in Table 1 in respect of the optical fiber in which the relative refractive index difference Δ1 was set at 0.45. Curve "a" shown in FIG. 6 denotes the change in the DPS value, and curve "b" denotes the change in the cutoff wavelength.

Figure 6:
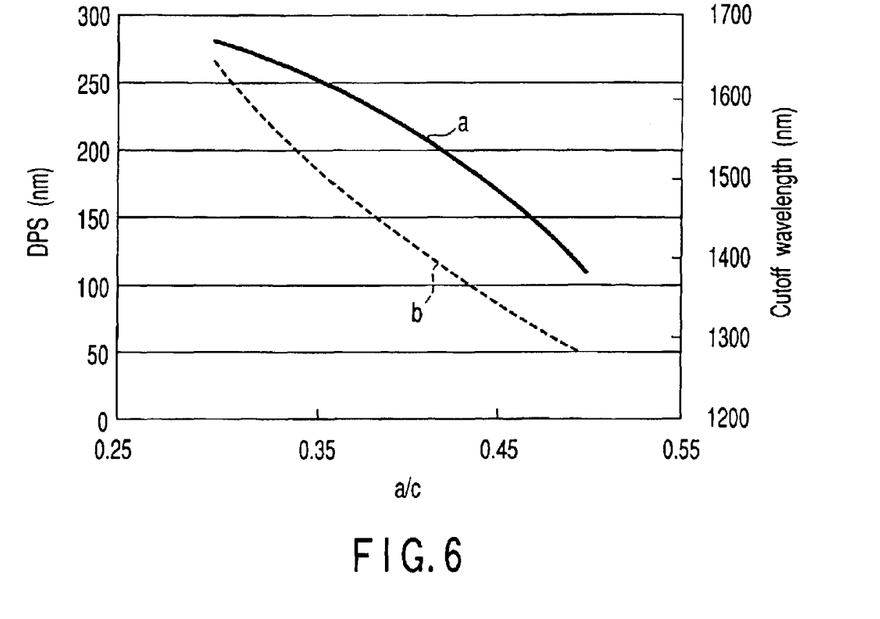
FIG. 6 is a graph showing the relationship among the core diameter ratio a/c, the value of DPS, and the cut-off wavelength.

As shown in FIG. 6, it is possible to lower the cutoff wavelength by increasing the diameter ratio a/c. It has been found, however, that, if the diameter ratio a/c is increased, the dispersion slope is also increased and the DPS value is diminished. Under the circumstances, it has been found that it is appropriate for the diameter ration a/c to fall within a range of between about 0.35 and about 0.45. As described above, the optimization was carried out for all the parameters.

As a result of the optimization of the parameters described above, it has been found that good characteristics can be obtained if the relative refractive index difference Δ1 is set to fall within a range of between 0.35% and 0.55%. It is desirable to have lower relative refractive index difference Δ1 because the effective core area can be increased and because the transmission loss and the polarized mode dispersion (PMD) can be decreased. It has been found, however, that, if the relative refractive index difference Δ1 is smaller than 0.35%, the absolute value of the dispersion is increased to 15 ps/nm/km or more.

On the other hand, it has also been found that, if the relative refractive index difference Δ1 is increased to 0.55% or more, it is difficult to increase the effective core area to 60 μm² or more for a wavelength of 1.55 μm.

Similarly, the optimization was carried out in respect of the relative refractive index difference Δ2 and the relative refractive index difference Δ3. As a result, it has been found that, unless the relative refractive index difference Δ2 is not smaller than −0.2%, the effective core area is made smaller than 60 μm² for a wavelength of 1.55 μm. Conversely, it has been found that, if the relative refractive index difference Δ2 is not smaller than 0.1%, the value of DPS is increased to exceed 100 nm, or the cutoff wavelength at a length of 2 m is increased to exceed 1,600 nm.

Further, it has been found that, unless the relative refractive index difference Δ3 is not smaller than 0.05%, the effective core area is made smaller than 60 μm², or the bending loss of diameter 20 mm is increased to 10 dB/m or more for a wavelength of 1.55 μm. On the other hand, it has been found that, if the relative refractive index difference Δ3 is not smaller than 0.35%, the value of DPS is increased to exceed 100 nm, or the cutoff wavelength is increased to exceed 1,600 nm.

As described above, it has been found that the optimum value of the relative refractive index difference Δ2 falls within a range of between −0.2 and 0.1%, and that the optimum value of the relative refractive index difference Δ3 falls within a range of between 0.05 and 0.35%.

Similarly, the optimization was carried out in respect of the value of a/c, i.e., the ratio in diameter of the first core 1 to the third core 3, and the value of b/c, i.e., the ratio in diameter of the second core 2 to the third core 3. As a result, it has been found that, unless the core diameter ratio a/c is not smaller than 0.35, the cutoff wavelength is increased to exceed 1,600 nm. Conversely, it has been found that, if the diameter ratio a/c is not smaller than 0.50, the value of DPS is decreased to 100 nm or less.

It has also been found that, unless the diameter ratio b/c is not smaller than 0.55, the cutoff wavelength is made longer than 1,600 nm, or the value of DPS is decreased to 100 nm or less. Conversely, it has been found that, if the diameter ratio b/c is not smaller than 0.85, the effective core area is made smaller than 60 μm² for a wavelength of 1.55 μm.

As described above, it has been found that the optimum value of the diameter ratio a/c falls within a range of between 0.35 and 0.50, and that the optimum value of the diameter ratio b/c falls within a range of between 0.55 and 0.85.

Further, it has been found that, unless the α-exponential denoting the shape of the first core is not smaller than 2, the bending loss is increased to exceed 10 dB/m so as to arrive at the condition of α≧2.

Then, optimization was carried out in respect of the negative dispersion optical fibers 12 and 14. The optimization of the negative dispersion optical fibers 12, 14 was carried out by selecting the construction shown in FIG. 5 as in the optimization of the positive dispersion optical fibers 11, 13.

Figure 7:
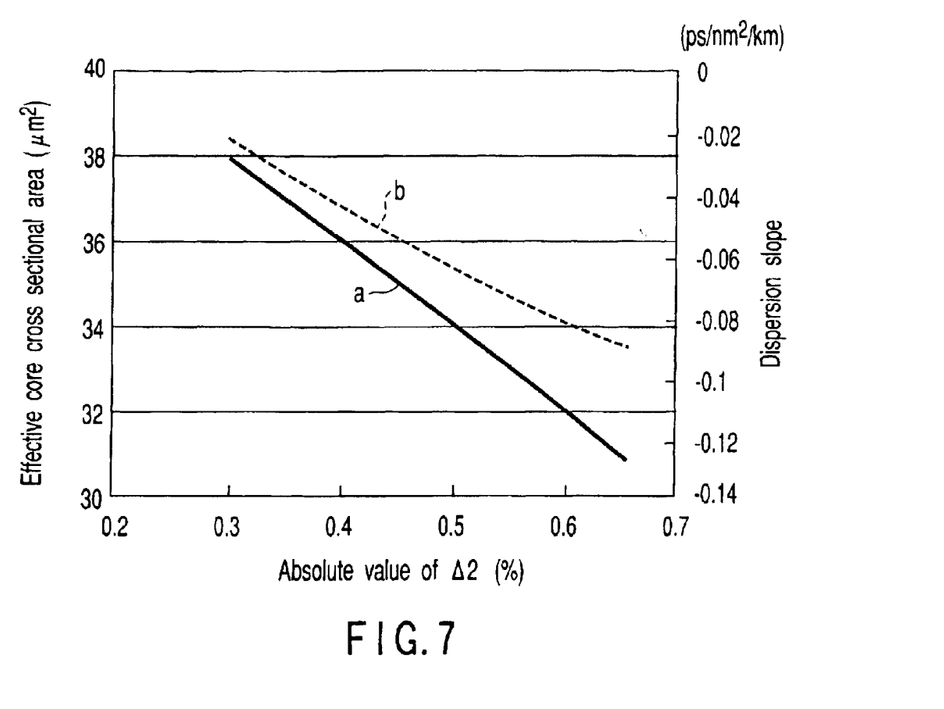
FIG. 7 is a graph showing the relationship among the absolute value of Δ2, the effective core area, and the slope in the negative dispersion optical fiber having the refractive index profile shown in the drawing.

First of all, the optimization was carried out in respect of the relative refractive index difference Δ2. FIG. 7 is a graph showing the changes in the characteristics relative to the absolute value of the relative refractive index difference Δ2, with the relative refractive index difference Δ1 set at 0.70%, with the value of α set at 4, with the relative refractive index difference Δ3 set at 0.2%, with the core diameter ratio a/c set at 0.40, and with the core diameter ratio b/c set at 0.70. Line "a" shown in FIG. 7 denotes the dispersion slope for a wavelength of 1.55 μm, with line "b" denoting the effective core area for a wavelength of 1.55 μm.

It should be noted, however, that the core diameter was adjusted to permit the bending loss of the diameter 20 mm for a wavelength of 1.55 μm to become about 5 dB/m. FIG. 7 shows that, if the relative refractive index difference Δ2 is decreased (i.e., if the absolute value is increased), it is possible to decrease the dispersion slope (decrease of the DPS value). However, the effective core area for a wavelength of 1.55 μm is also diminished simultaneously.

Under the circumstances, the optimization of the relative refractive index difference Δ2 was carried out by changing all the parameters. It has been found that the optimum relative refractive index difference Δ2 falls within a range of between −0.7 and −0.3%. If the relative refractive index difference Δ2 is not larger than −0.7%, the effective core area for a wavelength of 1.55 μm is made smaller than 30 μm². On the other hand, if the relative refractive index difference Δ2 is not smaller than −0.3%, the DPS value is increased to 500 nm or more when the effective core area for a wavelength of 1.55 μm is increased to 25 μm² or more. It follows that it is necessary for the relative refractive index difference Δ2 to be not larger than −0.3%.

What should be noted here is that, in an optical fiber having such a large depressed layer, the dependency of the cutoff wavelength on the fiber length tends to be somewhat diminished. Therefore, in the negative dispersion optical fibers 12, 14 of the construction described above, it is desirable for the cutoff wavelength at a fiber length of 2 m to be not longer than 1,500 nm.

The optimization of the other parameters was also carried out in respect of the negative dispersion optical fibers 12, 14 so as to obtain the results described below. Specifically, the optimization was carried out on the premise that the DPS value should be 500 nm or less. It has been found that it is necessary for the relative refractive index difference Δ1 to fall within a range of between 0.55 and 0.80%. It has been found that, if the relative refractive index difference Δ1 is not larger than 0.55%, the bending loss for a diameter of 20 mm is increased to exceed 10 dB/m, or the cutoff wavelength is increased to exceed 1,500 nm. It has also been found that, if the relative refractive index difference Δ1 is not smaller than 0.80%, the effective core area for a wavelength of 1.55 μm is made smaller than 30 μm².

It has also been found that it is necessary for the relative refractive index difference Δ3 to fall within a range of between 0.1 and 0.3%. To be more specific, it has been found that, if the relative refractive index difference Δ3 is smaller than 0.1%, the bending loss for a diameter of 20 mm is increased to 10 dB/m or more. On the other hand, it has also been found that, if the relative refractive index difference Δ3 exceeds 0.3%, the cutoff wavelength is increased to 1,500 nm or more.

Further, the core diameters were studied so as to adjust the value of a:b:c. It has been found that, when the diameter ratio a/c falls within a range of between 0.30 and 0.45, it is possible to obtain low bending loss characteristics while maintaining the other characteristics at satisfactory values. It has been found that, when the diameter ratio a/c is smaller than 0.3, the effective core area for a wavelength of 1.55 μm is decreased to 30 μm² or less. On the other hand, it has been found that, if the diameter ratio a/c exceeds 0.45, the bending loss characteristics are increased to 10 dB/m or more for a diameter of 20 mm.

It has also been found that, when the diameter ratio b/c falls within a range of between 0.60 and 0.75, the bending loss for a wavelength of 1.55 μm is lowered to 10 dB/m (20 mm diameter) or less while maintaining the effective core area of 30 μm² or more for a wavelength of 1.55 μm, and the cutoff wavelength is maintained at 1,500 nm or less.

As described above, it is desirable for the diameter ratio (a:b:c) to be 0.30 to 0.45:0.65 to 0.75:1.0.

Further, it has been found that, unless the α-exponential denoting the shape of the first core 1 is not smaller than 2, the bending loss is increased to exceed 10 dB/m so as to arrive at the condition of α≧2.

Tables 2 and 3 show examples of the refractive index profile, which are expected to achieve good characteristics according to the result of the simulation, and the characteristics of the particular optical fibers. Table 2 is directed to examples of the positive dispersion optical fiber, and Table 3 is directed to examples of the negative dispersion optical fiber.

TABLE 2

| Δ1 % | α | Δ2 % | Δ3 % | a:b:c | Core diameter μm | Dispersion ps/nm/km | Slope ps/nm²/km | $A_{eff}$ μm² | λc nm | Bending loss dB/m |
|---|---|---|---|---|---|---|---|---|---|---|
| 0.40 | 10 | −0.10 | 0.18 | 0.5:0.63:1 | 14.0 | 14.8 | 0.072 | 101 | 1579 | 4.0 |
| 0.45 | 6 | 0 | 0.20 | 0.5:0.55:1 | 13.4 | 14.3 | 0.075 | 93 | 1584 | 3.0 |
| 0.45 | 6 | −0.10 | 0.10 | 0.5:0.60:1 | 13.8 | 13.1 | 0.073 | 86 | 1557 | 2.0 |
| 0.40 | 10 | 0 | 0.10 | 0.4:0.60:1 | 19.0 | 12.0 | 0.067 | 81 | 1567 | 2.0 |
| 0.40 | 10 | −0.15 | 0.15 | 0.4:0.60:1 | 21.0 | 11.3 | 0.066 | 75 | 1571 | 2.0 |
| 0.45 | 10 | 0 | 0.10 | 0.4:0.57:1 | 16.8 | 10.0 | 0.067 | 72 | 1477 | 2.0 |
| 0.45 | 10 | −0.20 | 0.10 | 0.4:0.58:1 | 19.6 | 9.1 | 0.069 | 67 | 1495 | 2.0 |

*Core diameter represents the value of 2c.

TABLE 3

| Δ1 % | α | Δ2 % | Δ3 % | a:b:c | Core diameter μm | Dispersion ps/nm/km | Slope ps/nm²/km | $A_{eff}$ μm² | λc nm | Bending loss dB/m |
|---|---|---|---|---|---|---|---|---|---|---|
| 0.80 | 2 | −0.44 | 0.2 | 0.39:0.74:1 | 15.6 | −14.0 | −0.064 | 31 | 1490 | 2.0 |
| 0.70 | 10 | −0.50 | 0.2 | 0.30:0.65:1 | 17.9 | −13.4 | −0.061 | 32 | 1490 | 3.0 |
| 0.72 | 5 | −0.50 | 0.2 | 0.32:0.65:1 | 13.0 | −12.3 | −0.063 | 32 | 1468 | 2.0 |
| 0.70 | 6 | −0.45 | 0.3 | 0.35:0.72:1 | 17.1 | −11.0 | −0.060 | 34 | 1461 | 3.0 |
| 0.60 | 10 | −0.50 | 0.2 | 0.34:0.66:1 | 17.4 | −10.2 | −0.057 | 35 | 1402 | 3.0 |
| 0.65 | 4 | −0.45 | 0.2 | 0.35:0.65:1 | 17.9 | −9.6 | −0.055 | 36 | 1472 | 2.0 |

*Core diameter represents the value of 2c.

In each of Tables 2 and 3 and the Tables referred to herein later, "Slope" denotes the value of the dispersion slope for a wavelength of 1.55 μm, and "Bend loss" denotes the loss value for a diameter of 20 mm for a wavelength of 1.55 μm.

A positive dispersion optical fiber having the refractive index profile shown in Table 2 achieves a dispersion not larger than 15 ps/nm/km for a wavelength of 1.55 μm and an effective core area not smaller than 60 μm² while maintaining the cutoff wavelength not longer than 1,600 nm and the bending loss for a wavelength of 1.55 μm not larger than 10 dB/m. Further, in the positive dispersion optical fiber included in the examples shown in Table 2, where the relative refractive index difference Δ1 between the first core 1 and the cladding 6 is low, i.e., about 0.40 to 0.45, low loss characteristics not higher than 0.25 dB/km can be expected.

Further, it has been found that the positive dispersion optical fiber included in the examples shown in Table 2 is capable of achieving a positive dispersion slope not larger than 0.08 ps/nm²/km for a wavelength of 1.55 μm. It follows that it is possible to achieve a DPS value not larger than 100 nm if the dispersion for a wavelength of 1.55 μm is set not smaller than 8 ps/nm/km.

Also, the negative dispersion optical fiber was found to achieve low bending loss characteristics, i.e., a bending loss for a diameter of 20 mm, which is not larger than 10 dB/m, for a wavelength of 1.55 μm, while maintaining the cutoff wavelength not longer than 1,500 nm, as shown in Table 3. Since the negative dispersion optical fiber achieves an effective core area not smaller than 30 μm² for a wavelength of 1.55 μm, a dispersion not smaller than −15 ps/nm/km, and a dispersion slope not larger than −0.050 ps/nm²/km, it is possible for the negative dispersion optical fiber to achieve a DPS value not larger than 300 nm, not to mention a DPS value not larger than 500 nm.

Further, since the negative dispersion optical fiber shown in Table 3 is capable of suppressing the relative refractive index difference Δ1 to a small value, the low loss characteristics not larger than 0.30 dB/km can also be expected. It follows that it is considered possible to achieve the desired characteristics by employing the particular construction described above.

As described previously, the positive dispersion optical fiber achieves the characteristics as shown in Table 2 by employing the relatively simple construction shown in FIG. 5. However, it has been found that, when the dispersion is diminished, the positive dispersion optical fiber having the refractive index profile as shown in FIG. 5 is caused to have a small effective core area of 80 μm² or less for a wavelength of 1.55 μm.

Particularly, where it is desired to diminish the bending loss of a diameter of 20 mm for a wavelength of 1.55 μm to 10 dB/m or less, it is impossible nowadays to obtain sufficiently low non-linear characteristics in the case where the value of the effective core area for a wavelength of 1.55 μm is smaller than that for the SMF even if the value noted above is larger than that for the DSF. Under the circumstances, it has been studied whether it is possible to enlarge further the effective core area by similarly performing optimization of the profile by using a more complex profile.

Figure 8:
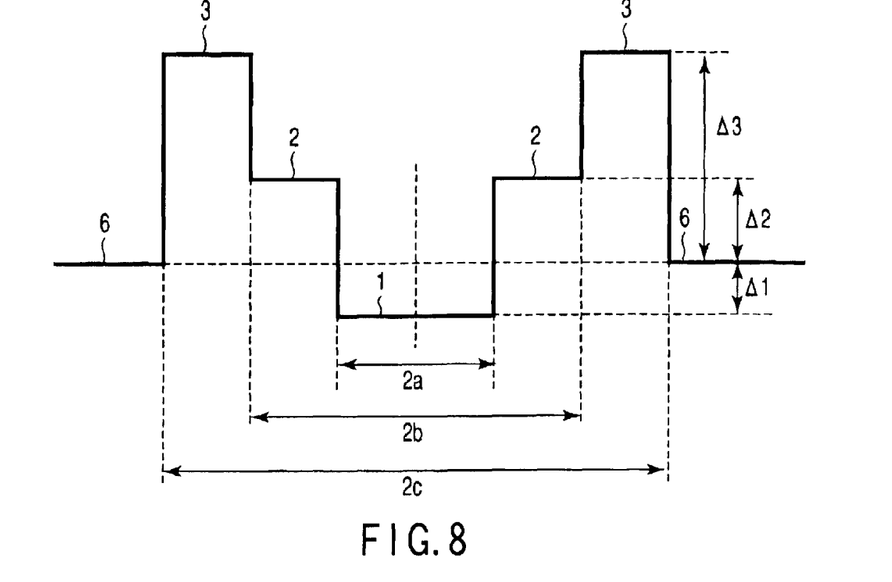
FIG. 8 exemplifies a concave type refractive index profile.
Figure 9:
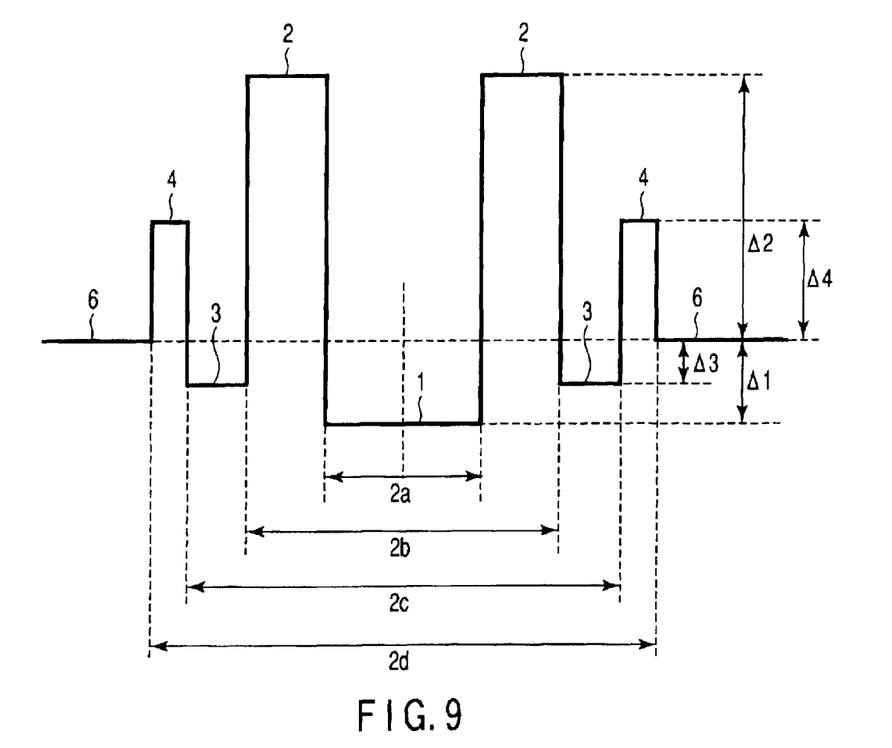
FIG. 9 exemplifies another concave type refractive index profile.

In order to enlarge the effective core area of a positive dispersion optical fiber, the optimization was performed using the refractive index profile shown in FIG. 8, with the results as shown in Table 4, and the optimization was also performed using the refractive index profile shown in FIG. 9, with the results as shown in Table 5.

TABLE 4

| Δ1 % | Δ2 % | Δ3 % | a:b:c | Core diameter μm | Dispersion ps/nm/km | Slope ps/nm²/km | $A_{eff}$ μm² | λc nm | Bending loss dB/m |
|---|---|---|---|---|---|---|---|---|---|
| −0.5 | 0.10 | 0.8 | 0.5:1:1.5 | 5.0 | 9.1 | 0.076 | 100 | 1522 | 2.0 |
| −0.9 | 0.38 | 0.62 | 0.5:1:1.5 | 5.5 | 10.5 | 0.070 | 106 | 1535 | 3.0 |
| −0.5 | 0.65 | 0.1 | 0.5:1:1.6 | 7.1 | 10.6 | 0.074 | 101 | 1550 | 2.0 |
| −0.5 | 0.62 | 0.1 | 0.5:1:1.4 | 7.5 | 11.9 | 0.071 | 104 | 1540 | 2.0 |

*Core diameter represents the value of 2b.

TABLE 5

| Δ1 % | Δ2 % | Δ3 % | Δ4 % | a:b:c | Core diameter μm | Dispersion ps/nm/km | Slope ps/nm²/km | $A_{eff}$ μm² | λc nm | Bending loss dB/m |
|---|---|---|---|---|---|---|---|---|---|---|
| −0.7 | 0.7 | 0 | 0.20 | 0.5:1:1.2:1.7 | 6.6 | 10.9 | 0.076 | 107 | 1549 | 2.0 |
| −0.8 | 0.7 | 0 | 0.28 | 0.4:1:1.3:1.7 | 6.3 | 11.0 | 0.076 | 100 | 1545 | 2.0 |

*Core diameter represents the value of 2b.

The positive dispersion optical fiber having the refractive index profile shown in FIGS. 8 and 9 is an optical fiber having a concave-type profile. Specifically, at least two cores are formed inside the cladding 6 in the positive dispersion optical fiber noted above, and the first core 1 positioned in the central portion of the optical fiber has a refractive index lower than that of the cladding 6 so as to form a concave-type profile.

As shown in Tables 4 and 5, it has been found that the positive dispersion optical fiber that is allowed to have a concave type refractive index profile as shown in FIGS. 8 and 9 permits decreasing the cutoff wavelength to 1550 nm or less, permits a bending loss for a diameter of 20 mm for a wavelength of 1.55 μm to be decreased to 3.0 dB/m or less, and also permits enlarging the effective core area for a wavelength of 1.55 μm to 100 μm² or more even in the case where the dispersion for a wavelength of 1.55 μm is decreased to 12 ps/nm/km or less.

Also, in the positive dispersion optical fiber having the refractive index profile as shown in FIGS. 8 and 9, the first core 1 forms a depressed layer and, thus, the effect of decreasing the Rayleigh scattering loss can also be expected.

On the other hand, when it comes to the negative dispersion optical fiber, the effective core area is slightly increased with a decrease of the dispersion in the construction having the refractive index profile shown in FIG. 5. However, it is seen that it is unavoidable for the absolute value of the dispersion slope to be decreased. Under the circumstances, measures for increasing the absolute value of the dispersion slope without impairing (or by further enlarging, if possible) the effective core area characteristics have been studied.

Figure 10:
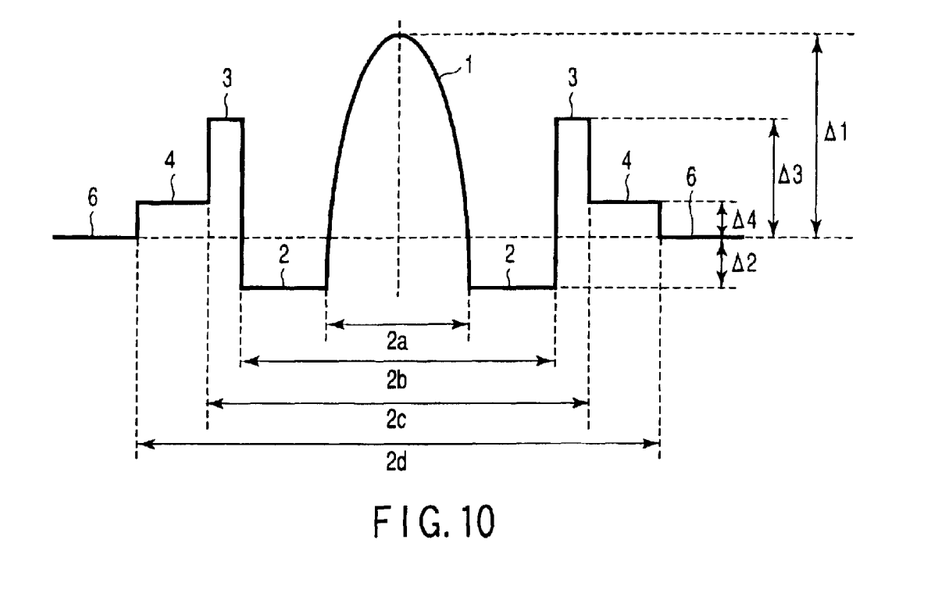
FIG. 10 shows the refractive index profile of a 4-layer core-type structure.
Figure 11:
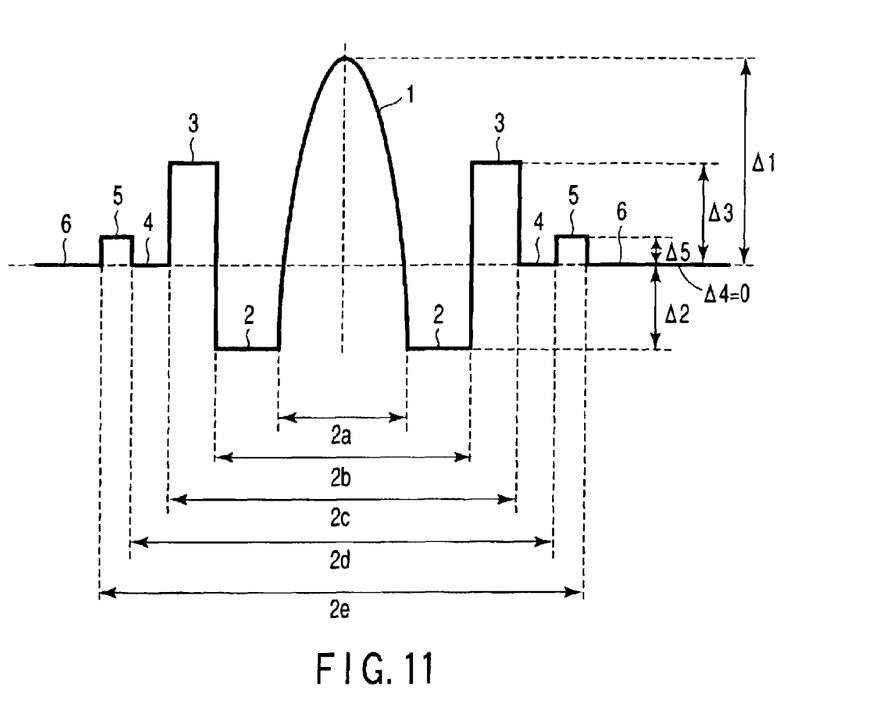
FIG. 11 shows the refractive index profile of a 5-layer core-type structure.

The study has been performed in respect of the negative dispersion optical fiber having a complex refractive index profile as shown in FIGS. 10 and 11. As a result, the characteristics as shown in Tables 6 and 7 given below were obtained:

A negative dispersion optical fiber having the refractive index profile as shown in FIGS. 10 and 11 is n optical fiber of a multi-layered structure having at least four cores formed inside a cladding 6 including a first core 1 positioned in the central portion of the optical fiber and having a refractive index higher than that of the cladding 6, a second core 2 positioned to surround the outer circumferential surface of the first core 1 and having a refractive index lower than that of the cladding 6, a third core 3 positioned to surround the outer circumferential surface of the second core 2 and having a refractive index higher than that of the cladding 6, and a Δ+layer positioned between the third core 3 and the cladding 4 and having a refractive index higher than that of the cladding 4.

In the construction shown in FIG. 10, a fourth core 4 having a refractive index higher than that of the cladding 4 is formed adjacent to the third core 3 in a manner to surround the outer circumferential surface of the third core 3. The fourth core 4 thus formed is used as the Δ+layer. Table 6 shows the results of the examples optimized by using the construction shown in FIG. 10.

In the construction shown in FIG. 11, the fourth core 4 having a refractive index equal to that of the cladding 4 is formed to surround the outer circumferential surface of the third core 3, and a firth core 5 having a refractive index higher than that of the cladding 6 is formed to surround the outer circumferential surface of the fourth core 4. The fifth core 5 thus formed is used as a Δ+layer. Table 7 shows the results of the examples optimized by using the construction shown in FIG. 11.

As shown in Tables 6 and 7, it has been found that, even in the negative dispersion optical fiber, it is possible to decrease the cutoff wavelength to 1,500 nm or less, to decrease the bending loss for a diameter of 20 mm to 3.0 dB/m or less for a wavelength of 1.55 μm, and to decrease the dispersion slope for a wavelength of 1.55 μm to −0.06 ps/nm²/km or less by employing the complex construction

TABLE 6

| Δ1 % | α | Δ2 % | Δ3 % | Δ4 % | a:b:c | Core diameter μm | Dispersion ps/nm/km | Slope ps/nm²/km | $A_{eff}$ μm² | λc nm | Bending loss dB/m |
|---|---|---|---|---|---|---|---|---|---|---|---|
| 0.7 | 2 | −0.55 | 0.26 | 0.15 | 0.5:1:1.4:1.55 | 11.50 | −11.4 | −0.063 | 38 | 1482 | 2.0 |
| 0.7 | 2 | −0.60 | 0.25 | 0.15 | 0.4:1:1.4:1.60 | 11.50 | −10.1 | −0.069 | 38 | 1462 | 3.0 |

*Core diameter represents the value of 2b.

TABLE 7

| Δ1 % | α | Δ2 % | Δ3 % | Δ4 % | Δ5 % | a:b:c | Core diameter μm | Dispersion ps/nm/km | Slope ps/nm²/km | $A_{eff}$ μm² | λc nm | Bending loss dB/m |
|---|---|---|---|---|---|---|---|---|---|---|---|---|
| 0.55 | 10 | −0.78 | 0.3 | 0 | 0.1 | 0.6:1:1.43:1.65:1.7 | 11.10 | −9.9 | −0.064 | 40 | 1483 | 2.0 |
| 0.70 | 6 | −0.72 | 0.3 | 0 | 0.1 | 0.6:1:1.45:1.55:1.7 | 10.90 | −9.8 | −0.068 | 38 | 1449 | 2.0 |
| 0.60 | 4 | −0.70 | 0.3 | 0 | 0.1 | 0.6:1:1.38:1.65:1.8 | 11.20 | −10.2 | −0.070 | 38 | 1476 | 2.0 |

*Core diameter represents the value of 2b.

as shown in FIG. 10 or 11 even in the case where the effective core area for a wavelength of 1.55 $\mu$m is increased to 35 $\mu m^2$ or more.

Also, a low transmission loss characteristics can also be expected because the construction shown in FIGS. 10 and 11 has a somewhat small value for the relative refractive index difference Δ1 between the first core 1 and the cladding 6.

As described above, the construction shown in FIGS. 8 to 11, in which the refractive index profile is made complex, exhibits good characteristics. Therefore, it is possible to employ the particular construction by placing a high importance on the characteristics. Under the circumstances, the present invention also provides an optical fiber in which dispersion is suppressed by using such a profile as is shown in FIGS. 8 to 11. It is considered possible to construct an excellent high speed transmission line by using an optical fiber effective in suppressing dispersion as described above depending on the situation.

In other words, the present inventor has developed a new-type positive dispersion optical fiber and a new type negative dispersion optical fiber as referred to in the embodiment given above so as to achieve a single-mode optical transmission line capable of suppressing the dispersion, having a low dispersion slope, capable of enlarging the effective core area, and having a low bending loss.

The characteristics of the novel optical transmission line are optimum as a high speed wavelength multiplexing transmission line in the future. The new-type optical transmission line constructed by using a positive dispersion optical fiber and the negative dispersion optical fiber makes it possible to manufacture easily an optical transmission line adapted for long-haul high-capacity transmission.

system. It is possible to determine appropriately the number of optical transmission lines, the number and kind of relays 9, etc.

The optical transmission system to which is applied the optical transmission line for each of the embodiments described above permits realizing an excellent optical transmission system having low non-linearity, low dispersion, low loss, and adapted for large-capacity transmission over a long distance.

EXAMPLE

The effectiveness of the present invention will now be confirmed by the Example of the present invention which follows. For actually forming an optical transmission line for each of the embodiments described above, a positive dispersion optical fiber and a negative dispersion optical fiber were manufactured on a trial basis in a manner to satisfy the characteristics described above.

In the first step, a positive dispersion optical fiber and a negative dispersion optical fiber were manufactured on a trial basis by using a W+segment core-type profile shown in FIG. 5, which is a relatively simple construction. As a result of the trial manufacture carried out with reference to the results of simulation, Table 8 shows the result of the trial manufacture of the positive dispersion optical fiber, and Table 9 shows the result of the trial manufacture of the negative dispersion optical fiber.

Incidentally, in Tables 8 and 9 and in the Tables referred to herein later, the indication "No." represents the number of the optical fiber manufactured on the trial basis. For example, the indication "No. 1" represents trial manufacture example 1.

TABLE 8

| No. | Profile | Transmission loss dB/km | Dispersion ps/nm/km | Slope ps/nm$^2$/km | $A_{eff}$ $\mu m^2$ | $\lambda c$ nm | Bending loss dB/m | PMD ps/√km |
|---|---|---|---|---|---|---|---|---|
| 1 | FIG. 5 | 0.189 | 14.5 | 0.070 | 98.0 | 1543 | 4.0 | 0.03 |
| 2 | FIG. 5 | 0.187 | 10.6 | 0.069 | 80.9 | 1523 | 6.5 | 0.03 |

TABLE 9

| No. | Profile | Transmission loss dB/km | Dispersion ps/nm/km | Slope ps/nm$^2$/km | $A_{eff}$ $\mu m^2$ | $\lambda c$ nm | Bending loss dB/m | PMD ps/√km |
|---|---|---|---|---|---|---|---|---|
| 3 | FIG. 5 | 0.217 | −14.6 | −0.062 | 30.9 | 1463 | 2.0 | 0.04 |
| 4 | FIG. 5 | 0.216 | −10.0 | −0.055 | 33.9 | 1440 | 7.0 | 0.03 |

Figure 12:
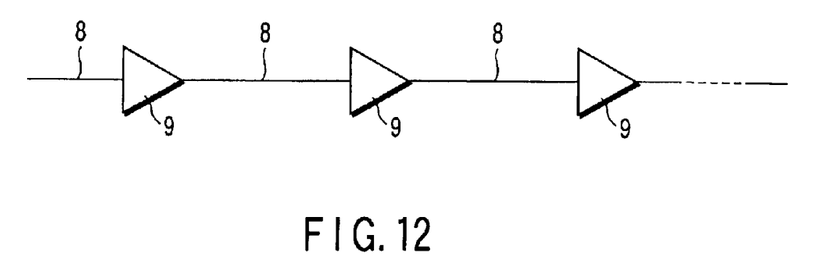
FIG. 12 exemplifies an optical transmission system of the present invention.

FIG. 12 exemplifies an optical transmission system to which is applied an optical transmission line for each of the embodiments described above. The optical transmission line is denoted by a reference numeral 8 in FIG. 12. The optical transmission system shown in FIG. 12 is formed by connecting a plurality of at least one kind of the optical transmission line selected from among optical transmission lines for each of the embodiments described above with a plurality of relays 9 (i.e., optical amplifiers in this case) interposed therebetween.

A light-transmitting section, a light receiving section, a light-transmitting-receiving section, etc., are arranged appropriately on the side of each of one end and the other end of the optical transmission system. Also, the number of optical transmission lines, the number and kind of relays 9, etc., are not particularly limited in the optical transmission Since the trial manufacture was carried out with reference to the results of simulation, the positive dispersion optical fiber for each of trial manufacture examples 1 and 2 was found to have an effective core area not smaller than 80 $\mu m^2$ for a wavelength of 1.55 $\mu$m, and the negative dispersion optical fiber for each of trial manufacture examples 3 and 4 was found to have an effective core area not smaller than 30 $\mu m^2$ for a wavelength of 1.55 $\mu$m. In other words, the optical fiber for each of trial manufacture examples 1 to 4 was found to have a value of an effective core area enlarged from that of the conventional DSF and RDF.

It should also be noted that the optical fiber for each of trial manufacture examples 1 to 4 permits suppressing transmission loss for a wavelength of 1.55 $\mu$m to a small value not larger than 0.22 dB/km. Further, the optical fiber for each of trial manufacture examples 1 to 4 permits suppressing the value of PMD for a wavelength of 1.55 $\mu$m to a level not higher than 0.05 ps/km$^{1/2}$ and also permits suppressing the absolute value of the dispersion for a wavelength of 1.55 μm to a level not higher than 15 ps/nm/km. It follows that characteristics adapted to high-speed transmission can be achieved.

Further, the optical fiber for each of trial manufacture examples 1 to 4 was found to be satisfactory in the other characteristics such as the cutoff wavelength and the bending loss.

Figure 13:
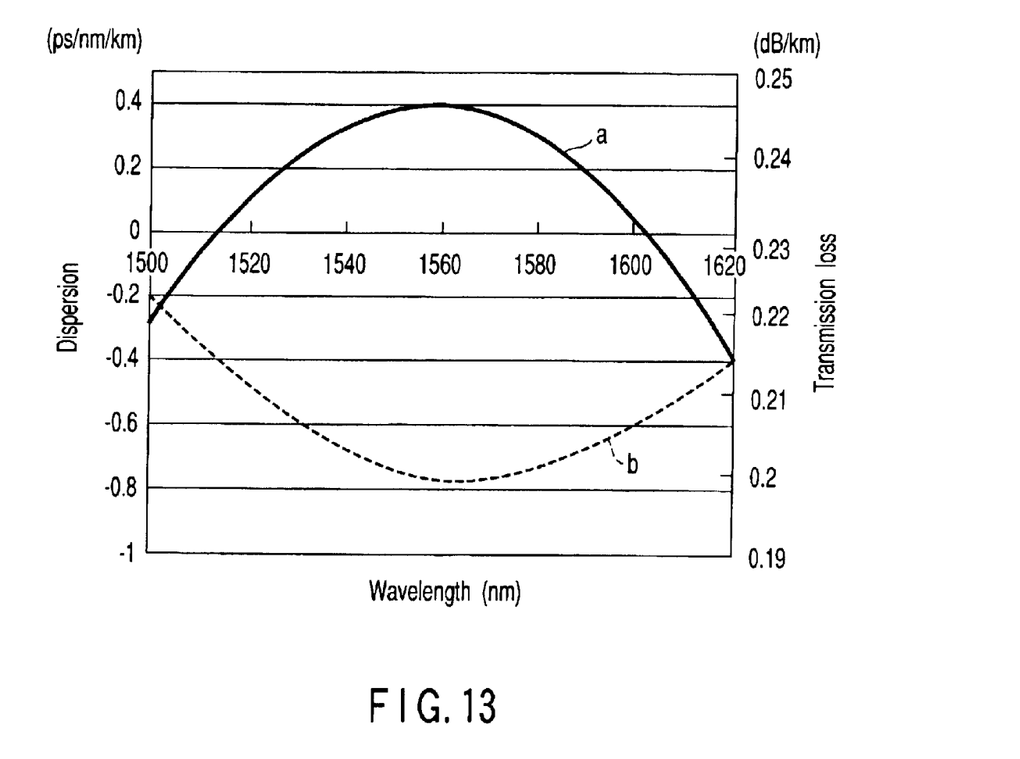
FIG. 13 is a graph showing the dispersion and the transmission loss at wavelengths of 1.5 to 1.62 μm over the entire optical transmission line formed by connecting a positive dispersion optical fiber and a negative dispersion optical fiber.

Then, the present inventor obtained the relationships between the dispersion and the wavelength and between the transmission loss and the wavelength in a entire line consisted of the positive dispersion optical fiber for trial manufacture example 2 and the negative dispersion optical fiber for trial manufacture example 4 as shown in FIG. 13. FIG. 13 shows that the dispersion is suppressed to fall within a range of between −0.4 and +0.4 ps/nm/km and that the transmission loss is suppressed to a level not higher than 0.23 dB/km over a wide wavelength band ranging between 1,500 nm and 1,620 nm.

In other words, it has been found that it is possible to achieve flat characteristics over a wide band by forming an optical transmission line for this embodiment by using the positive dispersion optical fiber for trial manufacture example 2 and the negative dispersion optical fiber for trial manufacture example 4. Also, since the absolute value of each dispersion is about 10 to 11 ps/nm/km, it is possible to suppress the accumulated dispersion to a small value.

Further, a trial manufacture was carried out by using the profile as shown in FIGS. 8 to 11 in an attempt to improve the characteristics of the positive dispersion optical fiber and the negative dispersion optical fiber. The trial manufacture was mainly intended to further enlarge the effective core area. Table 10 shows the results of the trial manufacture of a positive dispersion optical fiber, which was carried out with reference to the results of the simulation shown in Tables 4 and 5 referred to previously, and Table 11 shows the results of the trial manufacture of a negative dispersion optical fiber, which was carried out with reference to the results of the simulation shown in Tables 6 and 7 referred to previously.

have a further enlarged value of the effective core area not smaller than 100 μm$^2$ in spite of the construction that the absolute value of the dispersion for a wavelength of 1.55 μm was suppressed to 10 to 11 ps/nm/km.

Further, the dispersion slope characteristics of the negative dispersion optical fiber for each of trial manufacture examples 9 to 12 was found to be highly satisfactory, i.e., not larger than −0.06 ps/nm$^2$/km, for a wavelength of 1.55 μm, as apparent from Table 11. The transmission loss for each of trial manufacture examples 9 to 12 was somewhat high, i.e., 0.21 to 0.25 dB/m, though the value is sufficiently small. Further, the value of PMD is relatively large, though the value is suppressed to a enough low level of 0.10 ps/km$^{1/2}$ or less.

It is considered possible to further decrease the transmission loss and PMD in the negative dispersion optical fiber depending on the optimization of the conditions achieved in the future. For example, it is effective to lower the refractive index of the entire profile by using, for example, a depressed cladding.

As described above in detail, the optical transmission line of the present invention has made it possible to construct a low accumulated dispersion type high speed optical transmission line excellent in low non-linear characteristics relative to SPM, XPM, FWM, etc.

Also, it is possible to construct easily an optical transmission line producing the excellent effects described above by connecting at least three kinds of optical fibers or by connecting a positive dispersion optical fiber to a negative dispersion optical fiber in the optical transmission line of the present invention.

Further, it is possible to ensure more easily the low loss characteristics and the low non-linear characteristics of the optical transmission line if the transmission loss and the effective core area of the positive dispersion optical fiber and the negative dispersion optical fiber are set to fall within prescribed ranges in the optical transmission line of the present invention.

Further, it is possible to always achieve low dispersion for the entire optical transmission line if the DPS values of the positive dispersion optical fiber and the negative dispersion

TABLE 10

| No. | Profile | Transmission loss dB/km | Dispersion ps/nm/km | Slope ps/nm$^2$/km | A$_{eff}$ μm$^2$ | λc nm | Bending loss dB/m | PMD ps/√km |
|---|---|---|---|---|---|---|---|---|
| 5 | FIG. 8 | 0.211 | 10.4 | 0.071 | 100.4 | 1513 | 4.0 | 0.08 |
| 6 | FIG. 8 | 0.214 | 10.5 | 0.075 | 107.9 | 1540 | 7.5 | 0.10 |
| 7 | FIG. 9 | 0.218 | 10.6 | 0.077 | 100.5 | 1514 | 5.0 | 0.08 |
| 8 | FIG. 9 | 0.215 | 10.9 | 0.076 | 106.9 | 1523 | 8.5 | 0.08 |

TABLE 11

| No. | Profile | Transmission loss dB/km | Dispersion ps/nm/km | Slope ps/nm$^2$/km | A$_{eff}$ μm$^2$ | λc nm | Bending loss dB/m | PMD ps/√km |
|---|---|---|---|---|---|---|---|---|
| 9 | FIG. 10 | 0.238 | −10.6 | −0.062 | 37.9 | 1469 | 4.0 | 0.07 |
| 10 | FIG. 10 | 0.237 | −10.5 | −0.070 | 37.0 | 1458 | 3.0 | 0.06 |
| 11 | FIG. 11 | 0.245 | −10.4 | −0.068 | 39.8 | 1473 | 4.0 | 0.07 |
| 12 | FIG. 11 | 0.245 | −10.0 | −0.072 | 38.9 | 1445 | 5.0 | 0.08 |

The positive dispersion optical fibers for trial manufacture examples 5 to 8 were manufactured on a trial manufacture basis by using a more complex structure. As shown in Table 10, these positive dispersion optical fibers were found to optical fiber are set at prescribed values in the optical transmission line of the present invention.

In addition, it is possible to achieve without fail an optical transmission line of a low bending loss in the single mode for a wavelength of 1.55 μm if the cutoff wavelength and the bending loss characteristics of the positive dispersion optical fiber and the negative dispersion optical fiber are set at prescribed values in the optical transmission line of the present invention.

Further, if the optical transmission line of the present invention is constructed to have prescribed refractive index profiles of the positive dispersion optical fiber and the negative dispersion optical fiber, it is possible to manufacture easily the positive dispersion optical fiber and the negative dispersion optical fiber so as to achieve an optical transmission line having the excellent characteristics described above.

What should also be noted is that, according to the optical transmission system of the present invention, it is possible to realize an excellent optical transmission system adapted for high-capacity transmission over a long distance by using the optical transmission line producing the excellent effects describe above.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical transmission line comprising a positive dispersion optical fiber having a positive dispersion at a wavelength in 1.55 μm band and a negative dispersion ooptical fiber connected to said positive dispersion optical fiber and having a negative dispersion at the wavelength in 1.55 μm band, wherein said positive dispersion optical fiber has a transmission loss not larger than 0.25 dB/km at a wavelength of 1.55 μm and an effective core area not smaller than 60 μm$^2$ at the wavelength of 1.55 μm, said negative dispersion optical fiber has the transmission loss not larger than 0.30 dB/km and the effective core area not smaller than 30 μm$^2$ at the wavelength of 1.55 μm and said optical transmission line having a length L of 30 km to 150 km, an absolute value of a dispersion not smaller than 8 ps/nm/km at the wavelength of 1.55 μm at every point of the optical transmission line, a maximum accumulated dispersion not larger than 7.5×L (ps/nm) at the wavelength of 1.55 μm, and an average dispersion for an entire optical transmission line of −5 to +5 ps/nm/km at the wavelength of 1.55 μm.

2. The optical transmission line according to claim 1, wherein at least three kinds of optical fibers are connected to each other.

3. The optical transmission line according to claim 2, wherein a second positive dispersion optical fiber connected to said negative dispersion optical fiber and having the positive dispersion at the wavelength in 1.55 μm band.

4. The optical transmission line according to claim 2, wherein a second negative optical fiber connected to said first negative dispersion optical fiber and having the negative dispersion at the wavelength in 1.55 μm band.

5. The optical transmission line according to claim 1, wherein said positive dispersion optical fiber has at least 100 nm of a DPS value obtained by dividing a dispersion at the wavelength in 1.55 μm band by a dispersion slope at the same wavelength, and said negative dispersion optical fiber has at most 500 nm of the DPS value obtained by dividing the dispersion at the wavelength in 1.55 μm band by the dispersion slope at the same wavelength.

6. The optical transmission line according to claim 5, wherein a value, which is obtained by dividing the DPS value of the negative dispersion optical fiber at a wavelength in 1.55 μm band by the DPS value of the positive dispersion optical fiber at the same wavelength, falls within a range of 0.7 to 1.3.

7. The optical transmission line according to claim 1, wherein each of said positive dispersion optical fiber and said negative dispersion optical fiber has a cutoff wavelength not longer than 1,600 nm at 2 m, and each of said positive dispersion optical fiber and said negative dispersion optical fiber has a bending loss at a diameter 20 mm of 10 dB/m or less at the wavelength of 1.55 μm.

8. The optical transmission line according to claim 1, wherein at least one of said positive dispersion optical fiber and said negative dispersion optical fiber has a core part formed of at least three layers including a first core, a second core and a third core arranged in the order mentioned as viewed from the central portion of the optical fiber and a cladding positioned to surround the outer circumferential surface of the outermost core layer, and has a W+ segment core-type refractive index profile in which said first core has a refractive index higher than that of said cladding, said second core has a refractive index lower than that of said cladding, and said third core has a refractive index higher than that of said cladding.

9. The optical transmission line according to claim 1, wherein said positive dispersion optical fiber comprises a core part formed of at least layers including a first core and a second core, which are arranged in the order mentioned as viewed from the central portion of the optical fiber, and a cladding positioned to surround the outer circumferential surface of the outermost core layer, and has a concave-type refractive index profile in which said first core has a refractive index lower than that of said cladding.

10. The optical transmission line according to claim 1, wherein said negative dispersion optical fiber has a core part formed of at least four layers including a first core, a second core, a third core and a fourth core, which are arranged in the order mentioned as viewed from the central portion of the optical fiber, and a cladding positioned to surround the outer circumferential surface of the outermost core layer, said first core having a refractive index higher than that of said cladding, said second core having a refractive index lower than that of said cladding, said third core having a refractive index higher than that of said cladding, and said fourth core having a refractive index higher than that of said cladding.

11. The optical transmission line according to claim 1, wherein the optical transmission line having a length L of 30 km to 70 km.

12. An optical transmission system, comprising at least one relay and a plurality of optical transmission lines and connected to each other with said relay interposed therebetween, wherein said optical transmission line comprising a positive dispersion optical fiber having a positive dispersion at a wavelength in 1.55 μm band and a negative dispersion optical fiber connected to said positive dispersion optical fiber and having a negative dispersion at the wavelength in 1.55 μm band, and wherein said positive dispersion optical fiber has a transmission loss not larger than 0.25 dB/km at a wavelength of 1.55 μm and an effective core area not smaller than 60 μm$^2$ at the wavelength of 1.55 μm, said negative dispersion optical fiber has the transmission loss not larger than 0.30 dB/km and the effective core area not smaller than 30 $\mu m^2$ at the wavelength of 1.55 $\mu$m and said optical transmission line having a length L of 30 km to 150 km, an absolute value of a dispersion not smaller than 8 ps/nm/km at the wavelength of 1.55 $\mu$m every point of the optical transmission line, a maximum accumulated dispersion not larger than 7.5×L (ps/nm) at the wavelength of 1.55 $\mu$m, and an average dispersion for an entire optical transmission line of −5 to +5 ps/nm/km at the wavelength of 1.55 $\mu$m.

13. An optical transmission line comprising a first positive dispersion optical fiber having a positive dispersion at a wavelength m 1.55 $\mu$m band, a negative dispersion optical fiber connected to said first positive dispersion optical fiber and having a negative dispersion at a wavelength in 1.55 $\mu$m band, and a second positive dispersion optical fiber connected to said negative dispersion optical fiber and having the positive dispersion at the wavelength in 1.55 $\mu$m band, wherein the optical transmission line having a length L of 30km to 150 km, an absolute value of a dispersion not smaller than 8 ps/nm/km at the wavelength of 1.55 $\mu$m every point of the optical transmission line, a maximum accumulated dispersion not larger than 7.5×L (ps/nm) at the wavelength of 1 55 $\mu$m, and an average dispersion for an entire optical transmission line of −5 to +5 ps/nm/km at the wavelength of 1.55 $\mu$m.

14. An optical transmission line comprising a positive dispersion optical fiber having a positive dispersion at a wavelength in 1.55 $\mu$m band, a first negative dispersion optical fiber connected to said positive dispersion optical fiber and having a negative dispersion at the wavelength in 1.55 $\mu$m band, and a second negative optical fiber connected to said first negative dispersion optical fiber and having the negative dispersion at the wavelength in 1.55 $\mu$m band, wherein the optical transmission line having a length L of 30 km to 150 km, an absolute value of a dispersion not smaller than 8 ps/nm/km at the wavelength of 1.55 $\mu$m every point of the optical transmission line, a maximum accumulated dispersion not larger than 7.5×L (ps/nm) at the wavelength of 1.55 $\mu$m, and an average dispersion for an entire optical transmission line of −5 to +5 ps/nm/km at the wavelength of 1.55 $\mu$m.

* * * * *